United States Patent [19]
Kawasaka

[11] Patent Number: 6,101,609
[45] Date of Patent: Aug. 8, 2000

[54] POWER CONSUMPTION REDUCED REGISTER CIRCUIT

[75] Inventor: Yasuki Kawasaka, Tenri, Japan

[73] Assignee: Sharp Kabushiki Kaisha, Osaka, Japan

[21] Appl. No.: 09/122,867

[22] Filed: Jul. 27, 1998

[30]  Foreign Application Priority Data

Jul. 29, 1997 [JP] Japan ................................. 9-203425
Jul. 22, 1998 [JP] Japan ................................ 10-206716

[51] Int. Cl.[7] ................................. G06F 1/32; H03K 3/01
[52] U.S. Cl. ......................... 713/322; 713/601; 377/77
[58] Field of Search .................................. 713/300–340, 713/600–601; 377/64–81

[56]  References Cited

U.S. PATENT DOCUMENTS

| | | | |
|---|---|---|---|
| 3,636,376 | 1/1972 | Hoffman | 377/78 |
| 3,715,030 | 2/1973 | Breuer | 377/77 |
| 4,630,295 | 12/1986 | Kamuro et al. | 377/81 |
| 5,028,814 | 7/1991 | Sung et al. | 327/203 |
| 5,128,974 | 7/1992 | Maekawa | 377/81 |
| 5,227,790 | 7/1993 | Shin et al. | 341/100 |
| 5,289,518 | 2/1994 | Nakao | 377/81 |
| 5,335,254 | 8/1994 | Tu et al. | 377/76 |
| 5,498,988 | 3/1996 | Reyes et al. | 327/199 |
| 5,721,740 | 2/1998 | Moon et al. | 714/731 |

FOREIGN PATENT DOCUMENTS

| | | |
|---|---|---|
| 5-28789 | 2/1993 | Japan . |
| 7-99434 | 4/1995 | Japan . |

*Primary Examiner*—Ayaz R. Sheikh
*Assistant Examiner*—Sumati Lefkowitz

[57]  ABSTRACT

The present invention provides a power consumption reduced register circuit which performs data processing in low power consuming and no wasteful manner. Reduction in power consumption of a synchronous circuit for accepting and outputting of data in synchronization with clock signals is achieved. An input to and output from a register are monitored and compared for outputting a determination result signal. A logical sum of an input determination control signal and the determination result signal is obtained in an OR gate, the output of which is latched to a D type flip-flop in synchronization with an invented signal of a clock signal input to the register. A logical product of the output of the flip-flop and the clock signal is obtained by an AND gate, the output signal from which is applied to the register as a clock signal.

4 Claims, 18 Drawing Sheets

POWER CONSUMPTION REDUCED REGISTER CIRCUIT

BACKGROUND OF THE INVENTION

The present invention relates to a power consumption reduced register circuit and in particular to a power consumption reduced register circuit in which power consumption is reduced by controlling clock signals which are input to registers of a data processing circuit for signal processing in response to changes in data which are input to each register.

Large scale integrated circuits include various functional circuit blocks such as flip-flops which accept data input signals input thereto in synchronization with clock signals. If synchronous circuits are dealt in designing of LSIs, functional blocks such as flip-flop circuits are designed in such a manner that clock signals are constantly input thereto.

As the scale of LSIs is increased and the operational speed becomes higher, a larger number of flip-flop circuits are incorporated in a LSI chip and clock signals are constantly input to the flip-flop circuits even if it is not necessary to change the states of the flip-flop circuits. Accordingly, there is a problem that unnecessary power is consumed due to the fact that the clock signals are input even if changes in the states of the flip-flop circuits are not necessary. There is the need to suppress such unnecessary change in clock signal.

In order to overcome the above-mentioned problem, Japanese Laid-Open Patent Publication (TOKKAIHEI) No. 7-99434 entitled "Power consumption reduced circuit" proposes a power consumption reduced circuit having functional circuit blocks for accepting data input signals supplied thereto in synchronization with clock signals, comprising a first circuit means for determining whether or not it is necessary for the function blocks to perform an accepting operation of the data input signals, and a second circuit means for permitting the clock signal to be output when the first circuit means outputs a signal representing that the signal accepting operation is necessary and for prohibiting the clock signal to be output when the first circuit means outputs a signal representing that the signal accepting operation is not necessary, whereby a clock signal output from the second circuit means is supplied as the clock signal for the functional circuit blocks.

FIG. 1 is a view for explaining the power consumption reduced circuit which is disclosed in Japanese Laid-Open Patent Publication (TOKKAIHEI) No. 7-99434. In the drawing, functional blocks of part of an LSI are shown. When an initiating signal $l_1$ is input, this initiating signal $l_1$ is received by a first-stage circuit unit 6 and a flip-flop 1 to which clock signals are constantly supplied. The first-stage circuit unit 6 activates the operation of the whole of the circuit shown in FIG. 1 and the flip-flop 1 triggers a flip-flop 2 via an OR gate 4.

The flip-flop 2 self-holds its state by feeding-back a signal $l_4$ from an output terminal of the flip-flop 2 by means of a self-holding operating circuit comprising an AND gate 3 and OR gate 4 and when an output signal $l_5$ of a NOR gate 8 assumes "1" the feed-back loop is cut off so that the flip-flop 2 is reset. A NOR gate 8 determines whether or not a subsequent circuit unit 7 is in operation, that is, it is necessary to change the self-need state by accepting the data input signal. In operation, the NOR gate 8 provides a result of signals representing necessity of accepting the data input signals.

Registers 9 (register A), 11 (register B), 13 (register C) and 15 (register D) are configured so that their latch timing control is conducted in response to a signal generated from the first-stage circuit unit 6 or the subsequent stage circuit unit 7 if necessary. Logical circuits 10 (logical circuit A), 12 (logical circuit B) and 14 (logical circuit C) are circuits for logically combining the outputs of the registers (A)9, (B)11, (C)13 and (D)15. The circuits may configured in any manner.

FIG. 2 is a timing chart explaining the operation in FIG. 1. A reference numeral $l_2$ denotes an input clock signal; $l_1$ the initiating signal; $l_3$ an output signal of the flip-flop 1, $l_4$ an output signal of the flip-flop 2, $l_5$ and output signal of the NOR gate 8, and $l_6$ output signal of the AND gate 5 (internal clock). The internal clock $l_6$ which is an output of the AND gate 5 serves as a gated clock and is applied to the subsequent circuit unit 7 and the registers 11 and 13.

The clock signals which are applied to a unit in which a unit for performing a closed operation for the functional blocks (for examples, a logic for determining the change of a flip-flop including a register) exists only in the functional blocks are generated only in a period of time when the functional blocks are operated. Normal clock signals are applied to the flip-flops which are capable of determining the change in response to an input signal from the other functional blocks. Clocks are necessary as timing information to cause storing elements of the functional blocks such as flip-flops, registers, memories and the like to operate only when they operate to change their states. Clocks are not necessary when the storing elements are not operated.

In case of D type flip-flop, a circuit comprising a three-input AND equivalent element is coupled to a clock input signal as mentioned above. Since it performs repeatingly assumes "1" or "0" in synchronization with the clock inputs, power is consumed in this unit. Reduction in power consumption can be achieved in a functional block having less frequency of operations, in particular a CMOS circuit if unnecessary clocks are provided. When a reset signal $l_7$ is used, it is necessary to turn the flip-flop 2 on in order that a reset operation will be normally completed.

In the invention as defined in Japanese Laid-Open Patent Publication (TOKKAIHEI) No. 7-99434, reduction in power consumption is achieved by suppressing the changes in unnecessary clock signals, that is, by prohibiting the application of the clock signals to the registers (B)9 and (C)7 when the same data is input. However, it is necessary that respective outputs of the registers A, B, C and D correspond to the outputs of the registers, which are desired to obtain in respective stages in a four-stage pipeline configured structure on a one-to-one basis as shown in a lower column of FIG. 3 (clock control method of the present invention) if the data inputs and outputs of the four-stage pipe line configured circuit is considered (hatching represents identical data in FIG. 3).

However, disturbance of the pipeline is caused in the configuration as set forth in Japanese Laid-Open Patent Publication (TOKKAIHEI) No. 7-99434 as shown in the upper column in FIG. 3 (prior art clock control method) so that one-to-one correspondence between the respective outputs of the registers A, B, C and D and their output can not be kept. That is, there is a problem that the output of the register D in the final stage does not correspond to its input since the same clock signal is applied to the registers B and C.

SUMMARY OF THE INVENTION

It is an object of the present invention to provide a power consumption reduced register circuit which performs data processing in a low power consuming and no wasteful manner by controlling clock signals for LSI depending upon the change in state of a flip-flop circuit (clock signals are also changed depending upon the change in data).

It is another object of the present invention to provide a synchronous circuit for accepting and outputting data in synchronization with clock signals, which is characterized in that power consumption reduced register circuit comprises a data determining unit for monitoring input and output data of register and for comparing the input data with the output data to output a comparison determination result signal; an OR gate for obtaining a logical sum of an input determination control signal and said determination result signal; a D type flip-flop for latching the output of said OR gate in synchronization with an inverted signal of a clock signal input to said register; and an AND gate for obtaining a logical product of the output of said D type flip-flop and said supplied clock signal, whereby the output signal from said AND gate is applied to said register.

It is another object of the present invention to provide a synchronous circuit having a pipeline configuration for accepting and outputting data in synchronization with clock signals, which is further characterized in that power consumption reduced register circuit comprises a plurality of the basic circuits which are coupled to each other, whereby clock signals are applied to only registers to be operated without causing any disturbance of the pipe line.

It is another object of the present invention to provide a synchronous circuit having a data determining unit which performs monitoring and comparison of input and output data of the other register as well as monitoring and comparison of the input and output data of a given register so that clock signals applied to each register are controlled.

It is another object of the present invention to provide a register circuit having a plurality of register stages, each stage accepting and outputting data in synchronization with a clock signal, comprising data match or unmatch detecting circuit for determining whether an input data to a first register stage matches an output data therefrom and for outputting a match and unmatch detection signals when both data match and do not match, respectively; clock signal supply control means for prohibiting a clock signal to be supplied to the first register stage in response to the match detection signals from said match and unmatch detecting means, and for permitting a clock signal to be supplied to the first register stage in response to the unmatch detection signals from said match and unmatch detecting means, latch circuits, each for one of second and subsequent stages, for storing said match or unmatch detecting signals which are transmitted in synchronization with the data transmission between the register stages; and clock signal supply control means, each for one of second and subsequent register stages, for prohibiting a clock signal to be supplied to each of second and subsequent register stages in response to the match detection signals from said latch circuits, and for permitting a clock signal to be supplied to each of second and subsequent register stages in response to the unmatch detection signals from said latch circuits.

PREFERRED EMBODIMENT OF THE INVENTION

Figure 1:
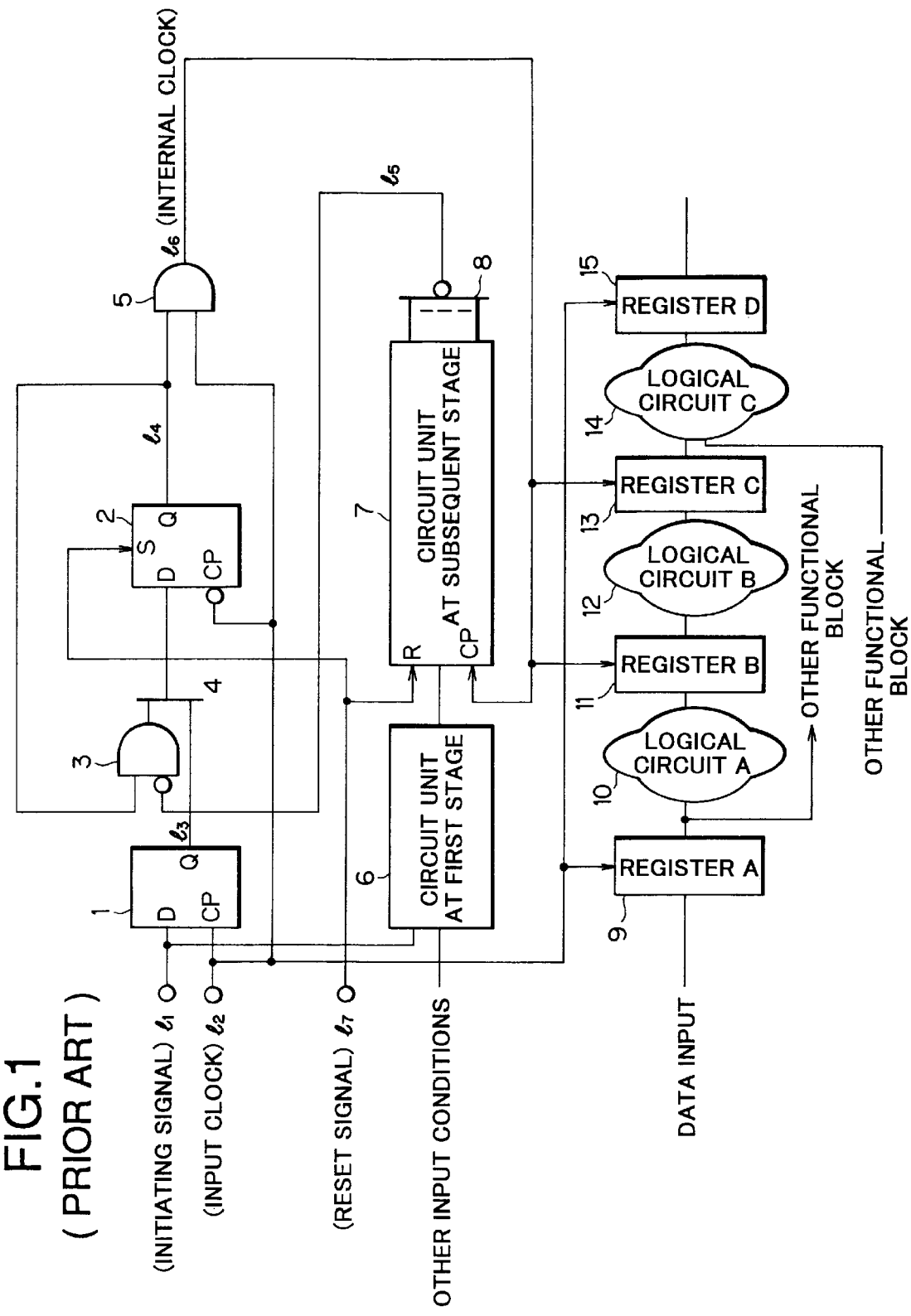
FIG. 1 is a schematic block diagram showing the configuration of the prior art power consumption reduced circuit.
Figure 2:
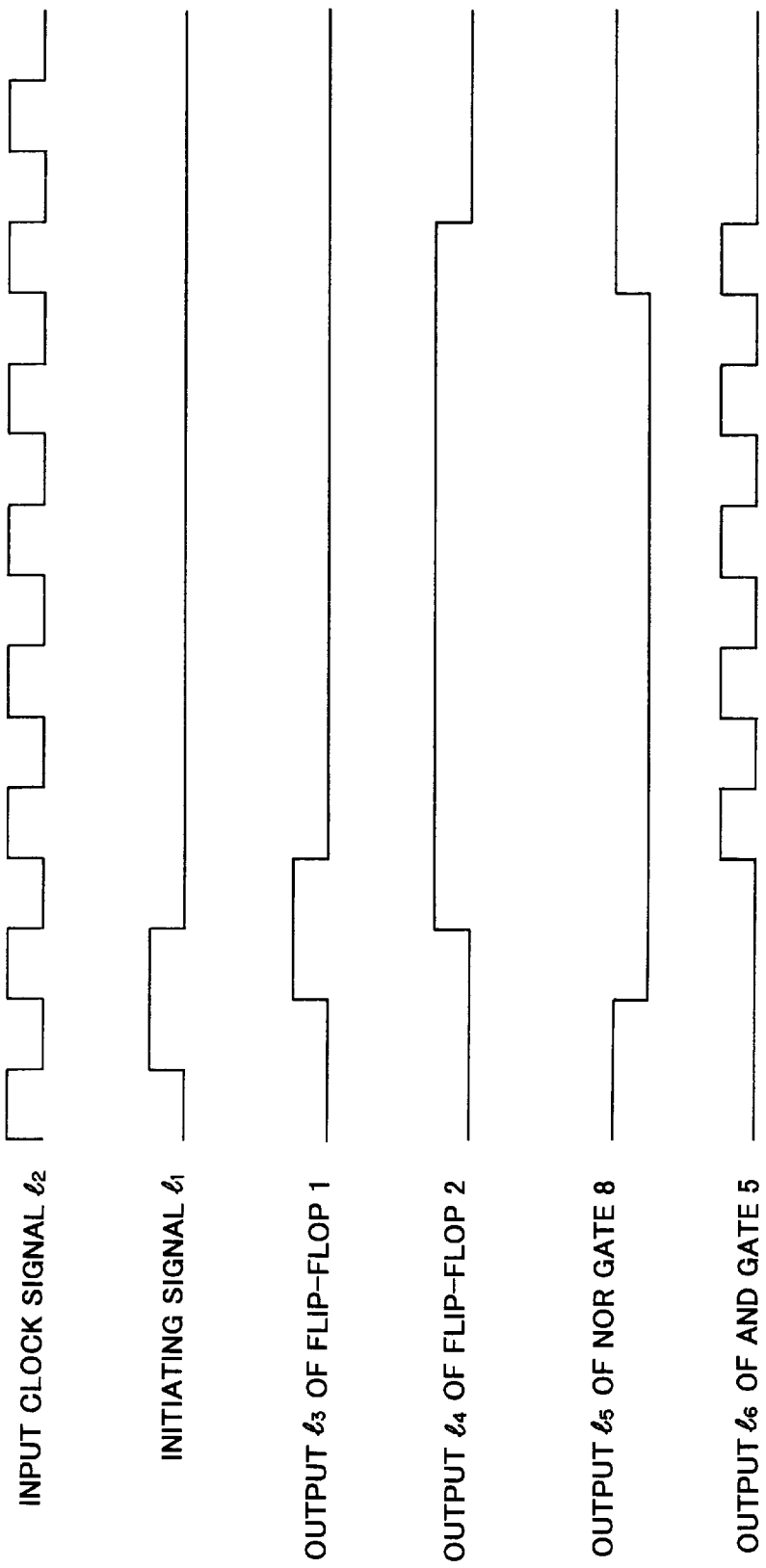
FIG. 2 is a time chart explaining the operation of the circuit shown in FIG. 1.
Figure 3:
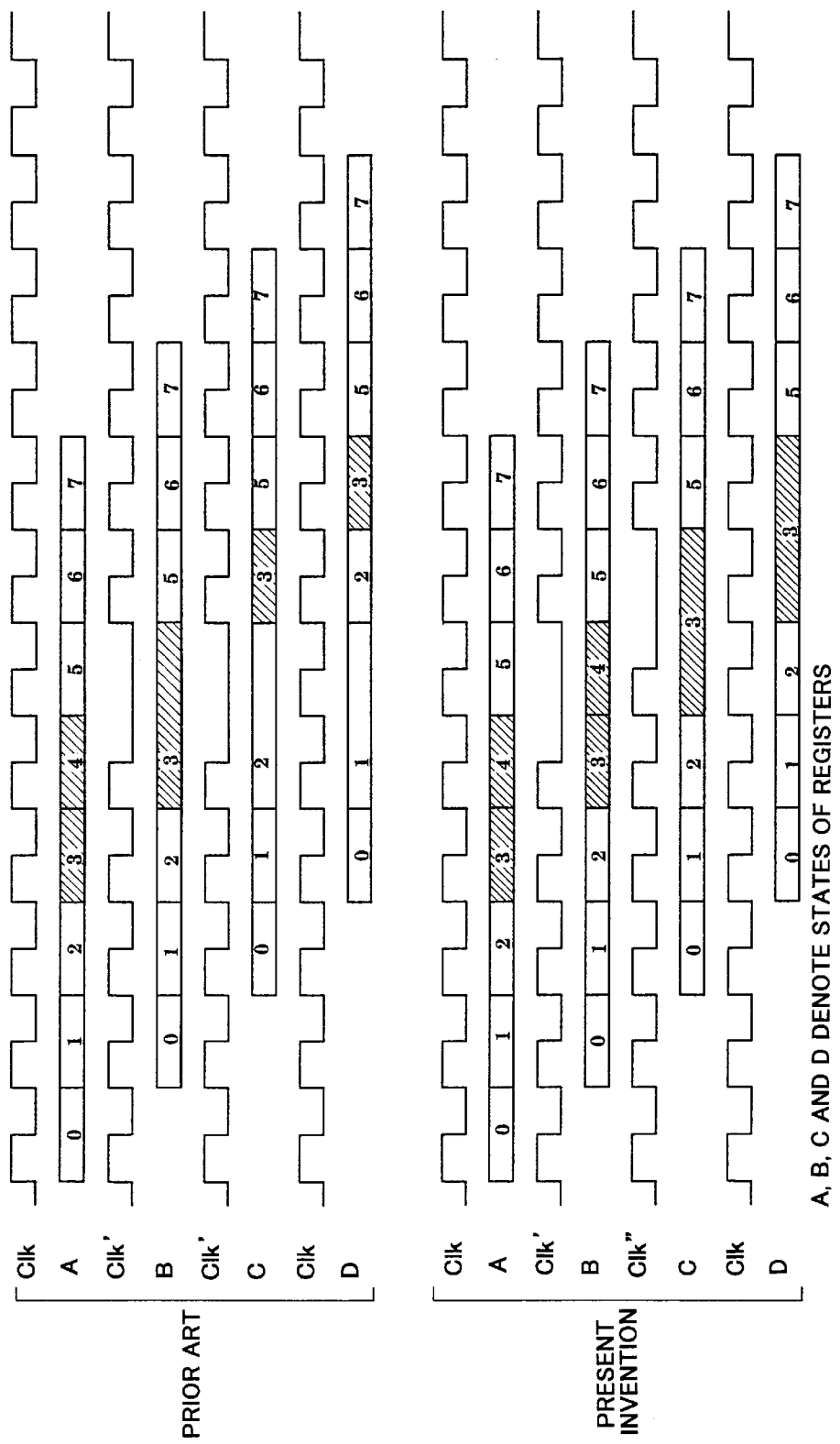
FIG. 3 is a timing chart showing the difference between pipeline control of the prior art and that of the present invention.
Figure 4:
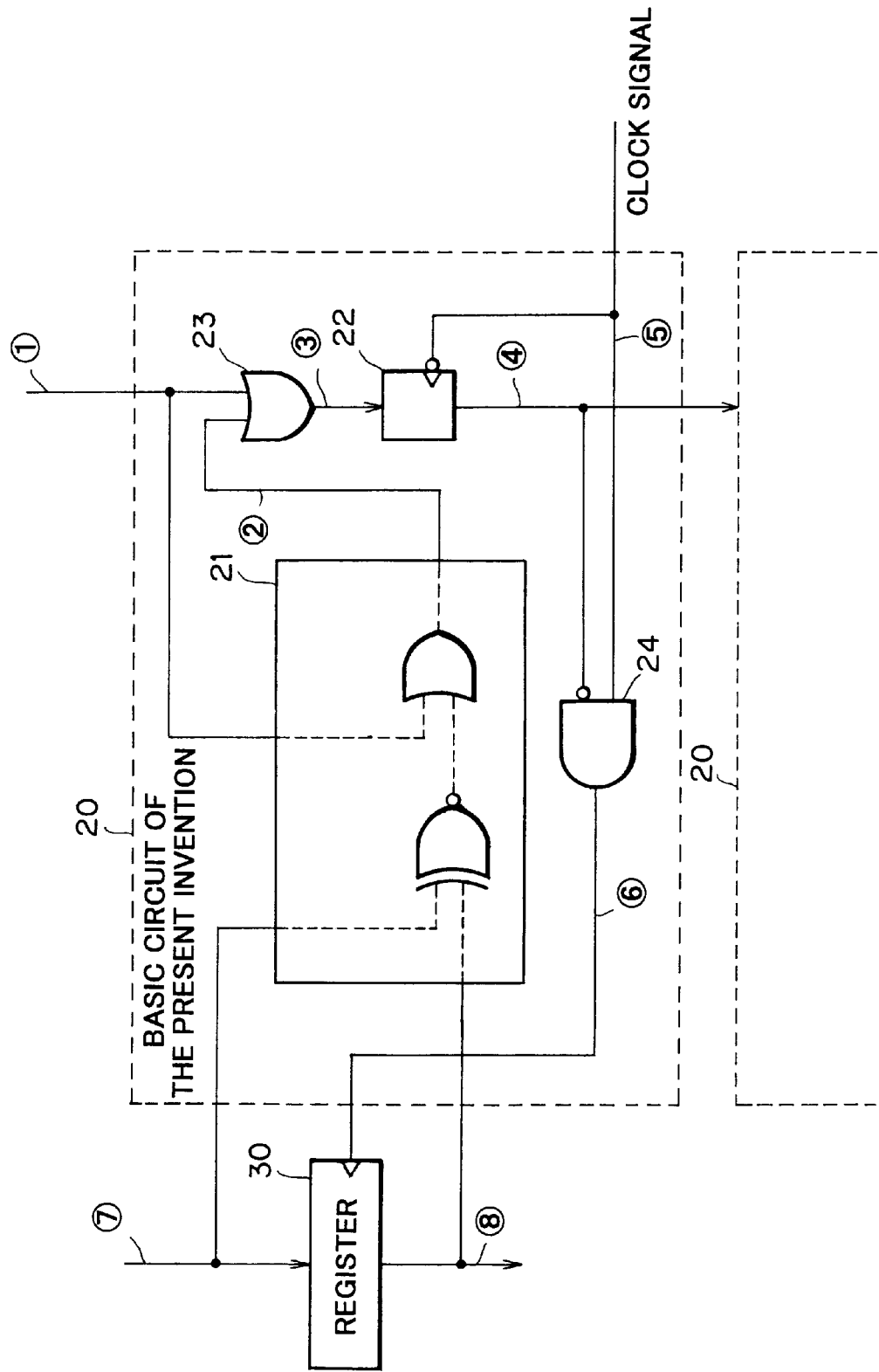
FIG. 4 is a schematic block diagram showing the configuration of a basic circuit of the present invention.

FIG. 4 is a schematic diagram showing the basic configuration of a consumed power control circuit of the present invention. The basic circuit 20 of the present invention comprises a data comparing unit 21, a D flip-flop 22, an OR gate 23 and an AND gate 24. In other words, the circuit is in such a very simple configuration that it comprises a comparing circuit 21 for comparing an input data ⑦ and output data ⑧ of a register 30 in interest, a D-type flip-flop 22, an AND gate 24 and on OR gate 23. The basic circuit 20 are disposed in respective registers in a direction of the flow of data processing. The clock signals are controlled in each register by means of this basic circuit configuration and by transmitting information on the control of clock signals, which has been performed in each register in a direction of data processing flow. Thus, disturbance of pipeline is suppressed.

In FIG. 4, it is determined from a value of a determination result signal ① which is generated in the preceding stage whether or not the data comparing unit 21 is to be operated. If the value of the determination result signal ① is "1", the data comparing unit 21 is brought into inoperative. If the value of the determination result signal ① is "0", the data comparing unit 21 is brought into operative. If the data comparing unit 21 determines from the determination result signal ① that data comparison is performed, a data ⑦ input to the register 30 is compared with a data ⑧ output from the register 30 in the data comparing unit 21. If the value of the data ⑦ matches the value of the data ⑧, the data comparing unit 21 generates "1" as the determination result signal ②. If otherwise, it generates "0" as the determination result signal.

Figure 5:
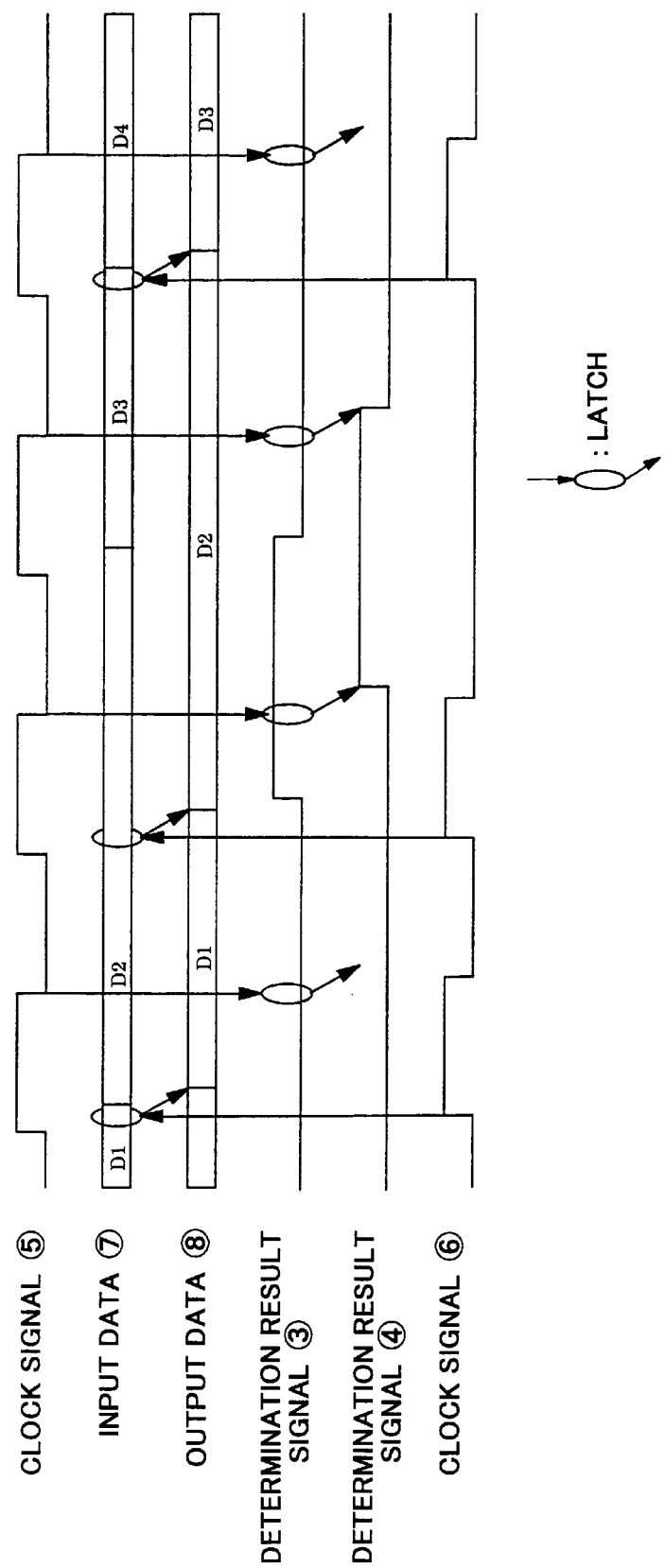
FIG. 5 is a timing chart explaining the operation of the basic circuit of the present invention.

FIG. 5 is a time chart explaining the operation in case the D2 data continues for 2 cycles in the basic circuit shown in FIG. 4. The determination result signals ① and ② which are generated in the previous stages are input to the OR gate 23, which outputs a determination result signal ③. This determination results signal ③ is accepted to the D type flip-flop 22 at the rising-up edge of a clock signal ⑤. The determination results signal ③ is output as a determination result signal ④ at the falling edge of the next clock signal ⑤. The determination result signal ④ is output to a basic circuit 20 and an AND gate at next stage. A clock signal ⑤ is input to an AND gate 24 in addition to the determination railside signal ④. AND gate 24 outputs the clock signal ⑥ as a clock signal for the register 30.

The clock signals ⑥ other than necessary clock pluses are all masked by the basic circuit 20 of the present invention, so that the register 30 and the clock pulses which are coupled thereto will not perform unnecessary operation. The clock pulses transmit information on clock control to the register at the next stage as the determination result signal ④. Accordingly, disturbance of the pipeline that the respective outputs of the registers A, B, C and D will not keep on-to-one correspondence relationship will not be caused. Fine control of clock signals can be performed.

Embodiment 1

Figure 6:
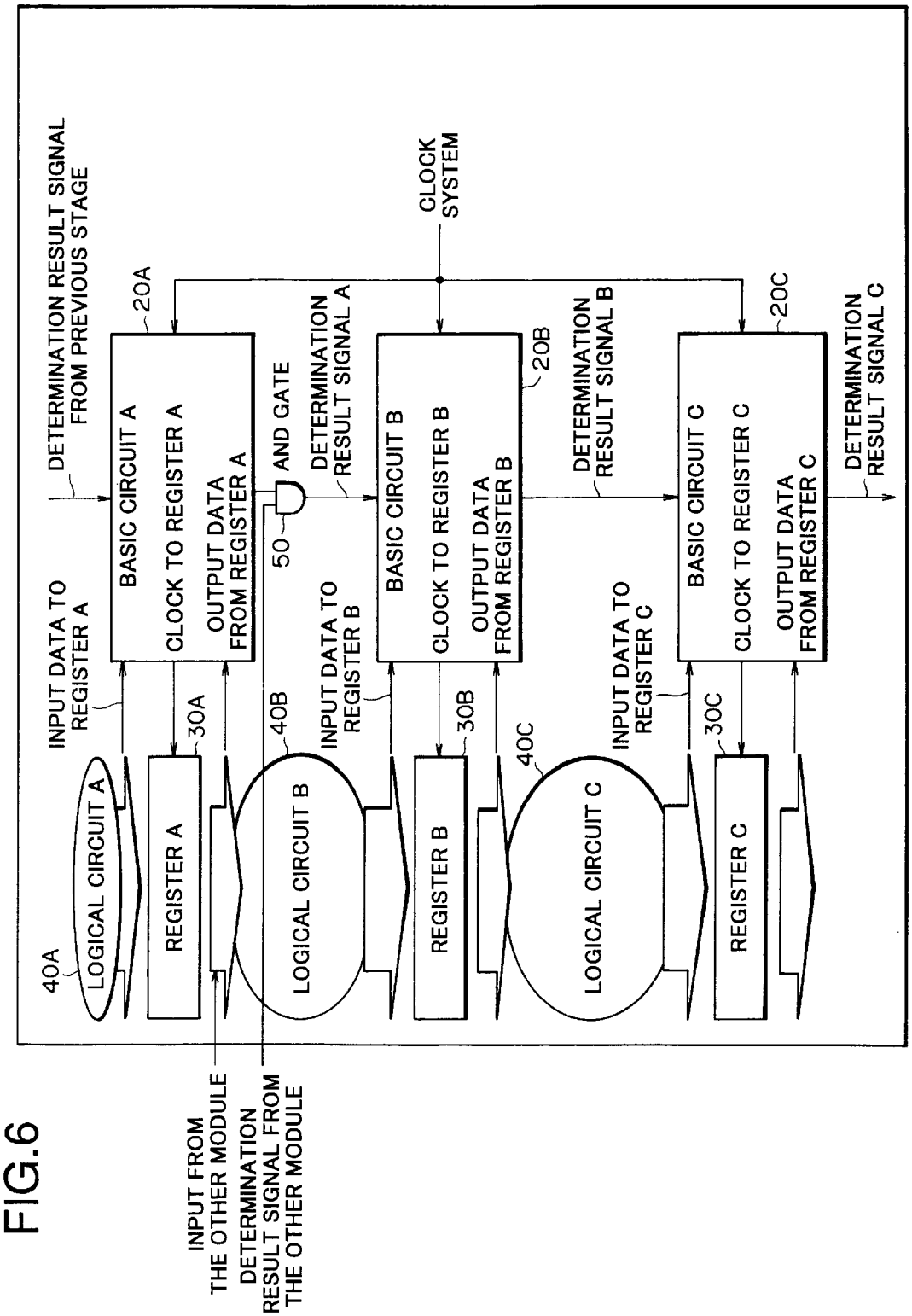
FIG. 6 is a schematic block diagram showing one embodiment (pipeline configuration in which data flows in one direction)
Figure 7:
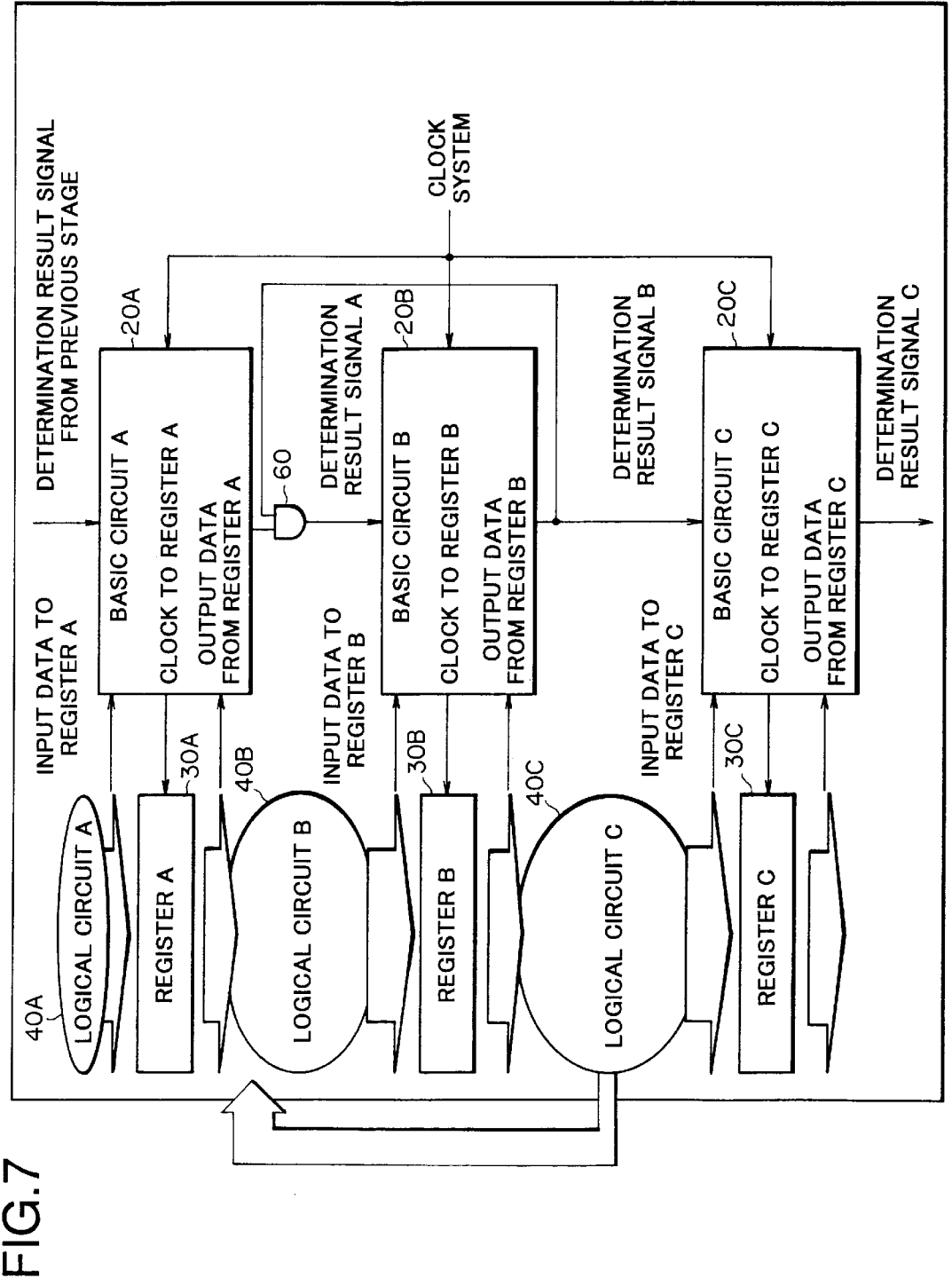
FIG. 7 is a schematic block diagram showing a modified embodiment 1 (pipeline configuration having loop processing)

FIG. 6 is a schematic block diagram for explaining one embodiment 1 of a power consumption reduced register circuit in which the present invention is embodied (a pipeline configuration in which data flows in one direction). FIG. 7 is a schematic block diagram explaining a modified embodiment 1 of a power consumption reduced register circuit in which the present invention is embodied (a pipeline configuration in which loop processing is conducted). In FIGS. 6 and 7, the basic circuit of the present invention 20A, 20B, 20C is disposed in each of the registers 30A, 30B and 30C for data processing. The basic circuits 20A, 20B and 20C which are disposed in respective registers 30A, 30B and 30C are coupled to each other via the determination result signals A, B and C in a direction of data processing flow. Control of clock signals which are input to the registers at respective stages are conducted by comparing input data with the data in previous cycle.

Figure 8:
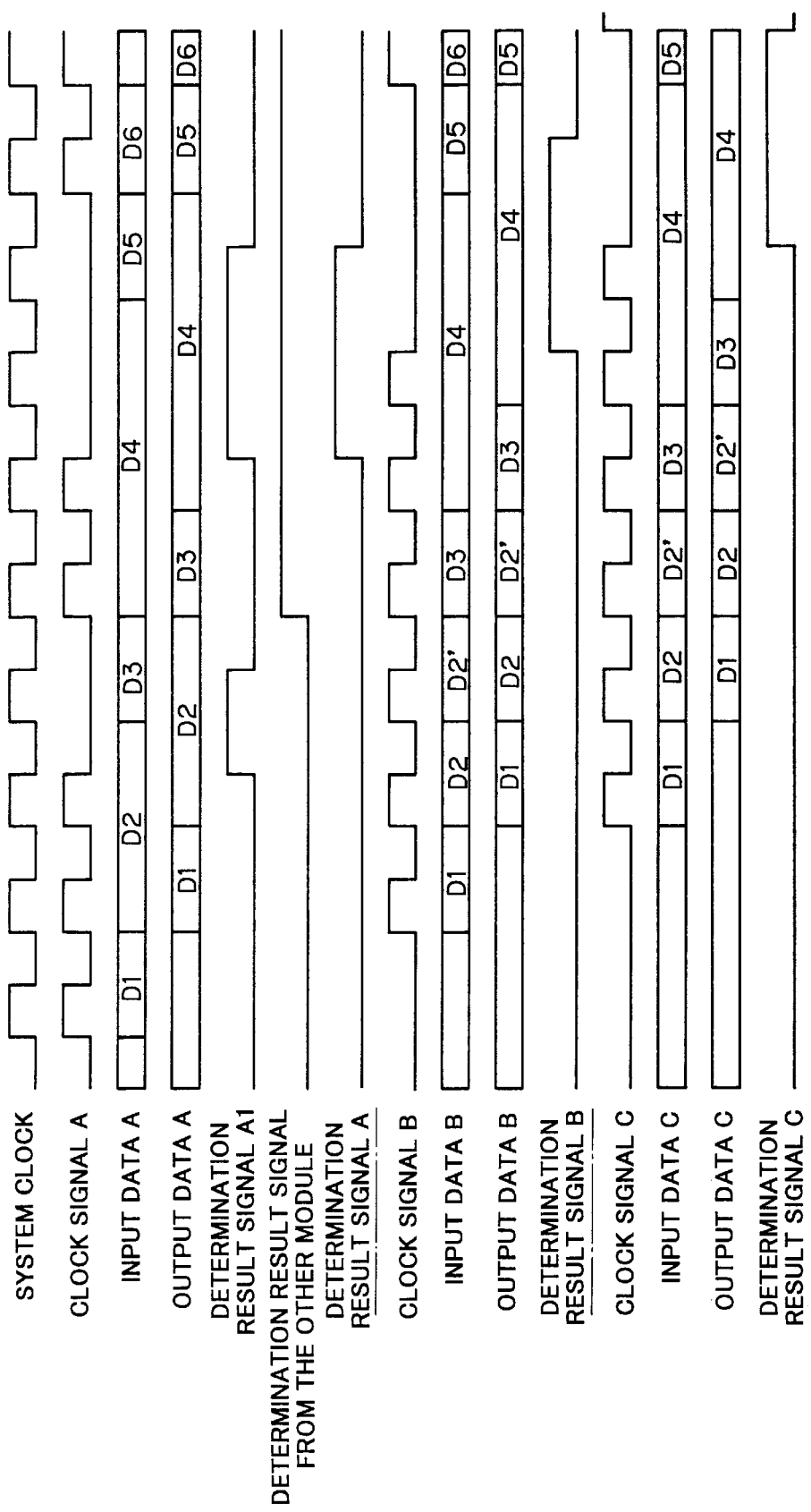
FIG. 8 is a timing chart showing the pipeline control of the present invention.

FIG. 8 is an exemplary timing chart when data processing proceeds in on direction as shown in FIG. 6. Control of clock signals is determined by the contents of data in respective stages and the information on clock control is transmitted in a direction of flow of data processing as shown in FIG. 8. No disturbance of the pipeline is caused. An AND gate 50 which is shown in FIG. 6 output an "H" signal when both the determination result signals from the basic circuit 20A and the other module and "H". Similarly to the AND gate 50 in FIG. 6, the AND gate 60 in FIG. 7 outputs "H" only when both the determination result signal from the basic circuit 20A and the determination result signal B from the basic circuit 20B and "H".

Since a power consumption reduced register circuit in which the present invention is applied transmits information on clock control between the registers and determines the control of the clock signals in response to input/output of data in each register, it may be applied in another LSIs in which data is input to and output from the other circuit in the course of pipeline processing or there is conducted loop processing for determining an accumulated sum as shown in FIG. 7.

Embodiment 2

Figure 9:
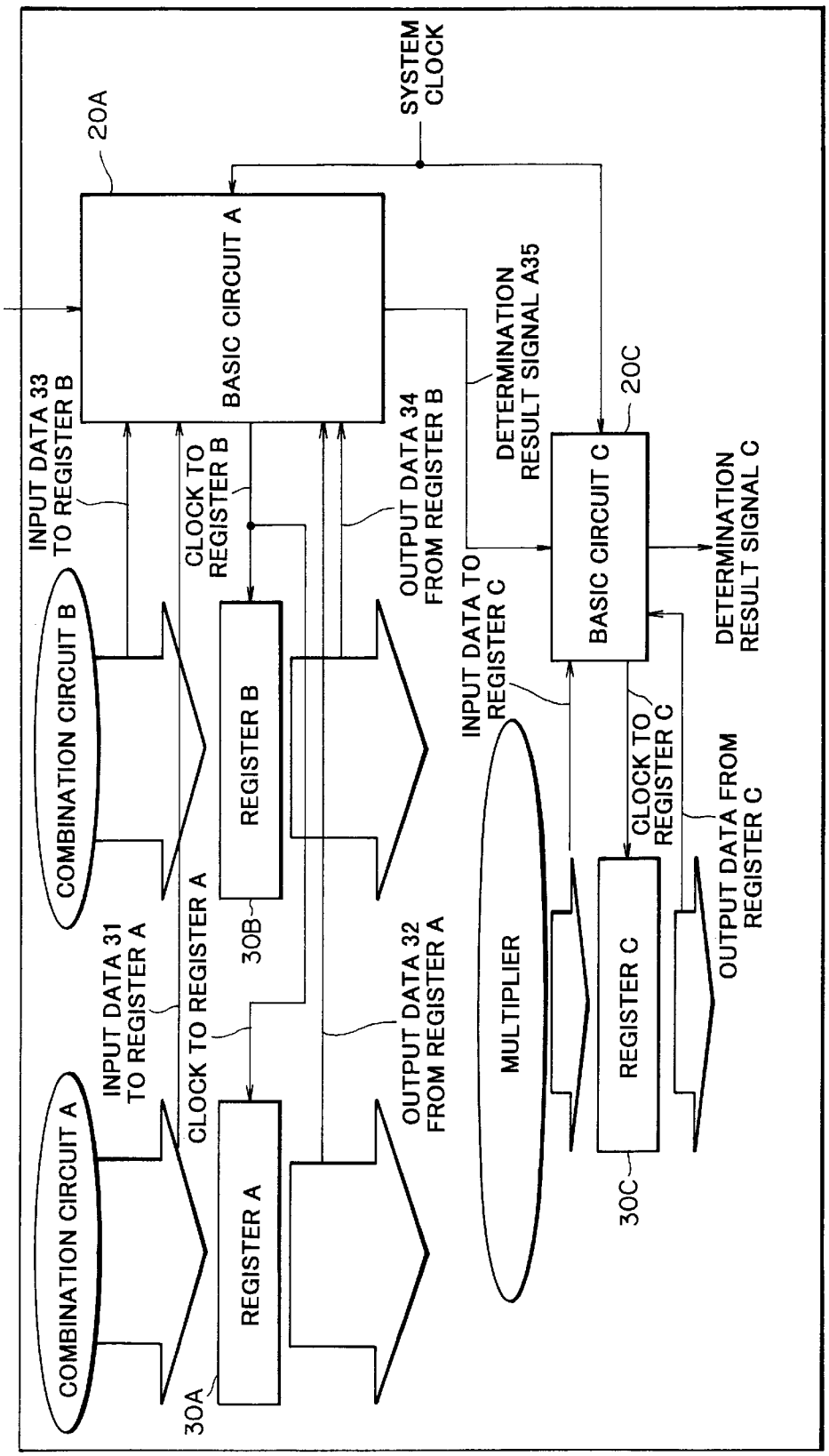
FIG. 9 is a schematic block diagram showing an embodiment 2 (pipeline configuration having branches; (multiplier)) of the present invention.

FIG. 9 is a schematic block diagram explaining an embodiment (a pipeline configuration having branches; computing element) in which the present invention is applied when a plurality of data flow into one data processing system. FIG. 9 shows an exemplary circuit of a multiplier to which the present invention is applied and FIG. 10 shows general circuit configuration.

Figure 10:
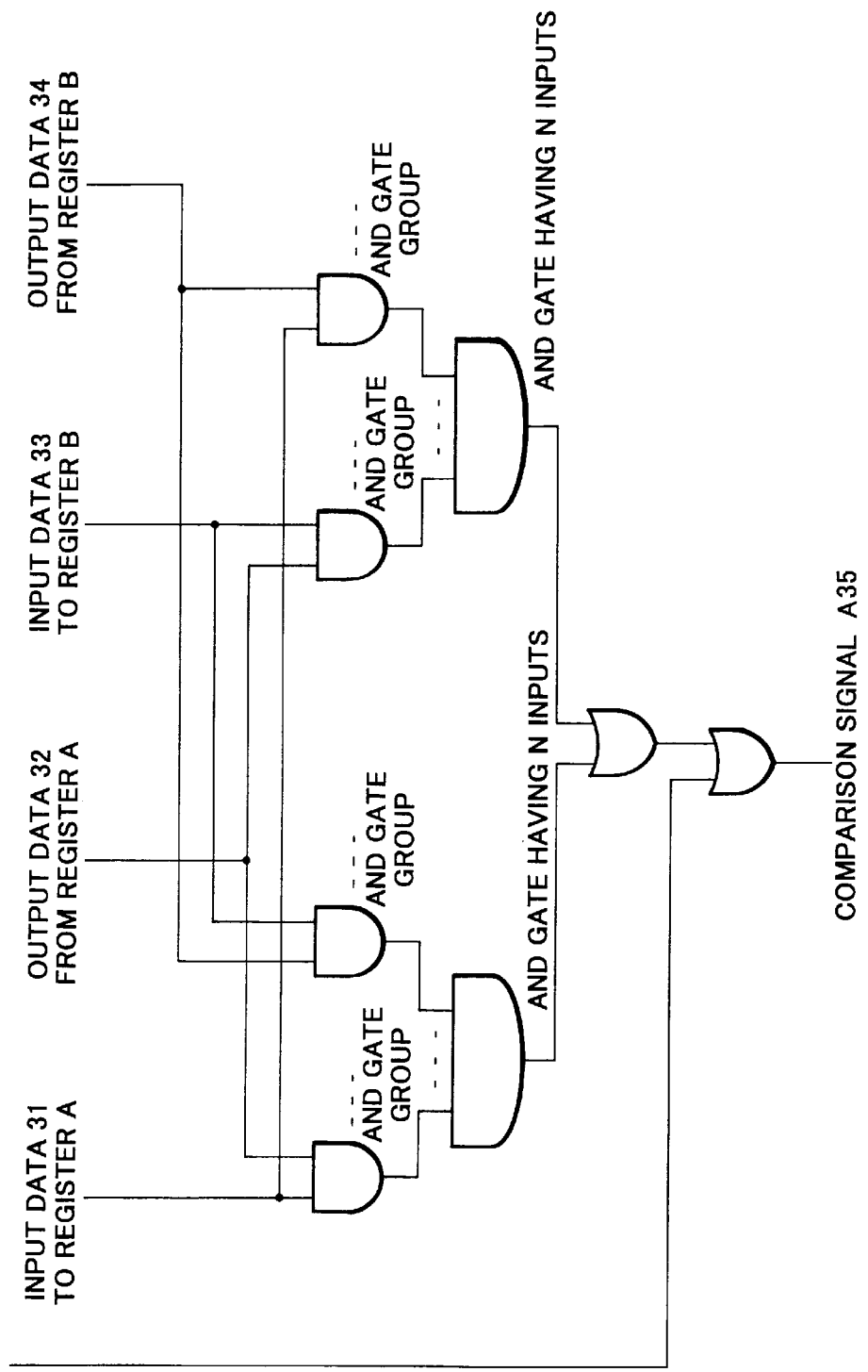
FIG. 10 is a diagram showing an exemplary data comparing circuit of the embodiment 2 of the present invention.

In such a case, a data determining device in the basic circuit has functions as follows:

If input data 31 to the register A=output data 32 from the register A and input data 33 to the register B=output data 34 form the register B in FIGS. 9 and 10, a comparison signal A35 then outputs "1".

If or otherwise, input data 31 to the register A=output data 34 to the register B (the input to A is replaced with output of B) and input data 33 to the register B=output data 32 to the register A (input of B is replaced with output of A), the comparison signal A35 then outputs "1".

If or otherwise ( either of the above-mentioned two paragraphs is denied), the comparison signal A35 then outputs "0".

As mentioned above, unnecessary power consumption in the multiplier can be suppressed or saved by providing the data comparator with the foregoing functions. Clock control in unit of module or register can be achieved by dealing each module as one register and disposing the inventive circuit in a tree-configuration in each unit of module, so that more efficient reduction in power consumption can be achieved.

Figure 11:
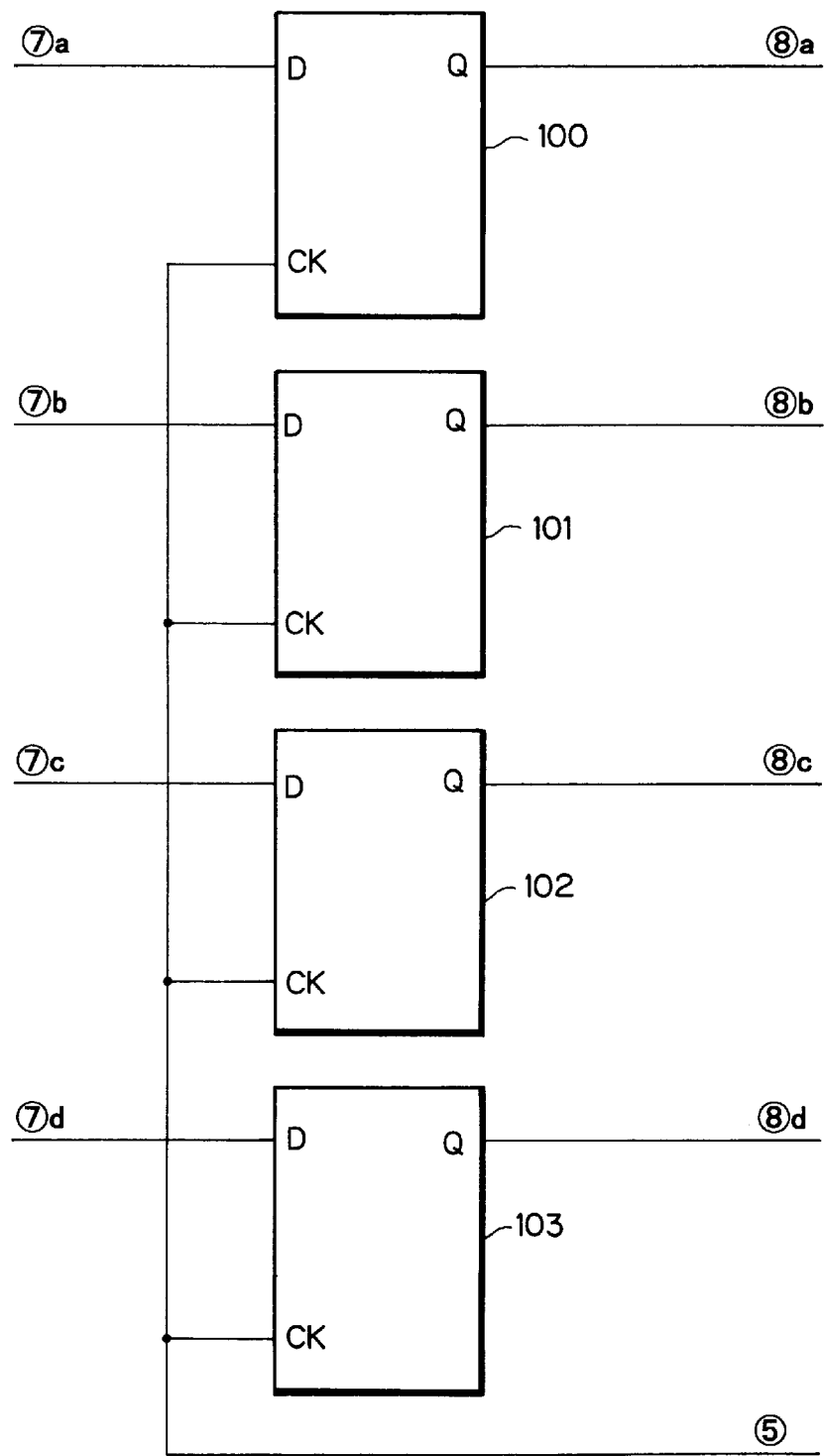
FIG. 11 is a circuit diagram explaining an exemplary configuration of the register.

FIG. 11 shows an exemplary configuration in case of being provided with a additional register. The register comprising D type flip-flop circuits 100 to 103 for outputting signals ⑧a to ⑧d in synchronization with the rising-up of a system clock which has temporarily latched 4 bit serial data ⑦a to ⑦d.

Figure 12:
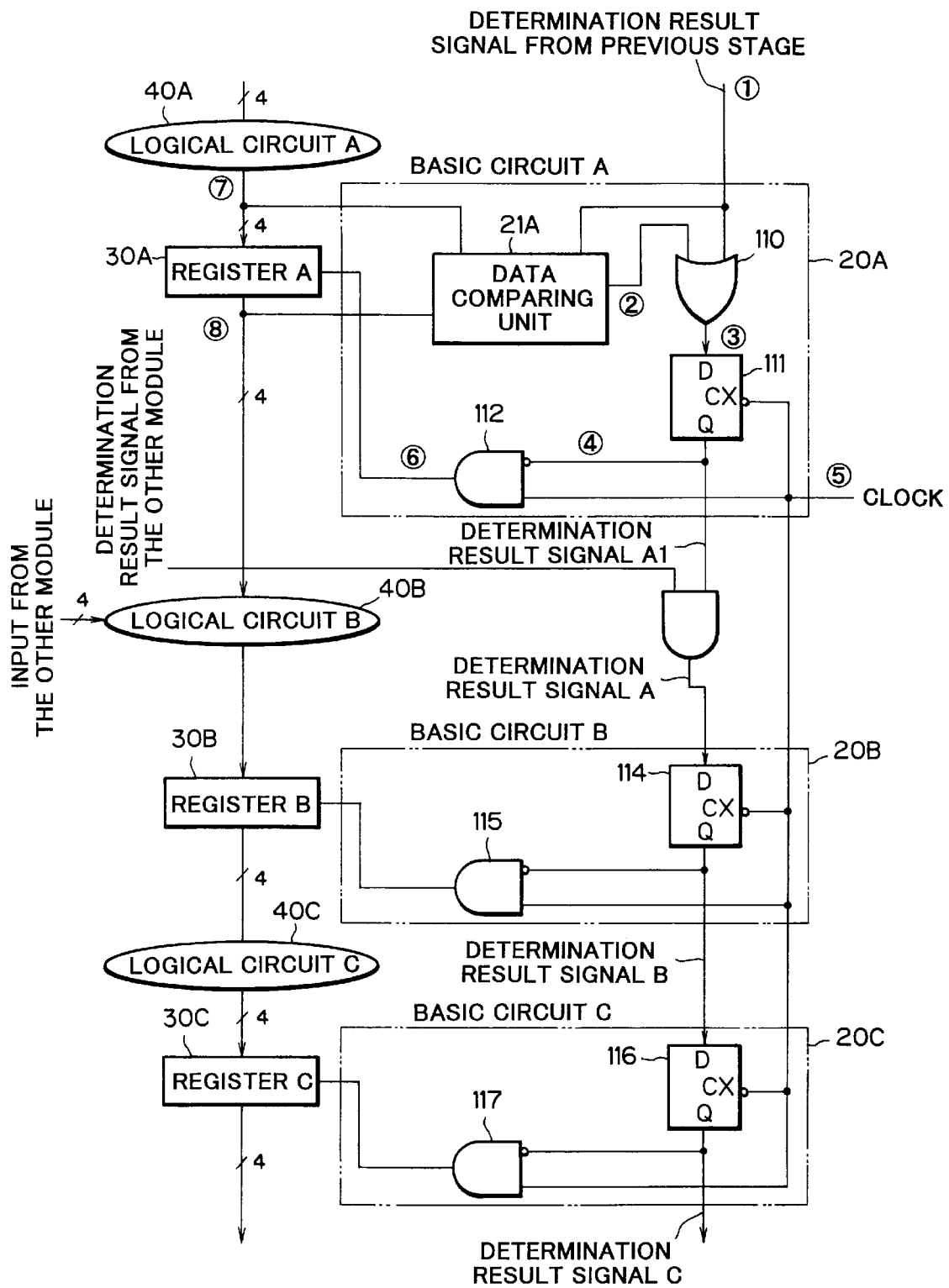
FIG. 12 is a circuit diagram showing the detailed circuit configuration of the embodiment shown in FIG. 6.
Figure 13:
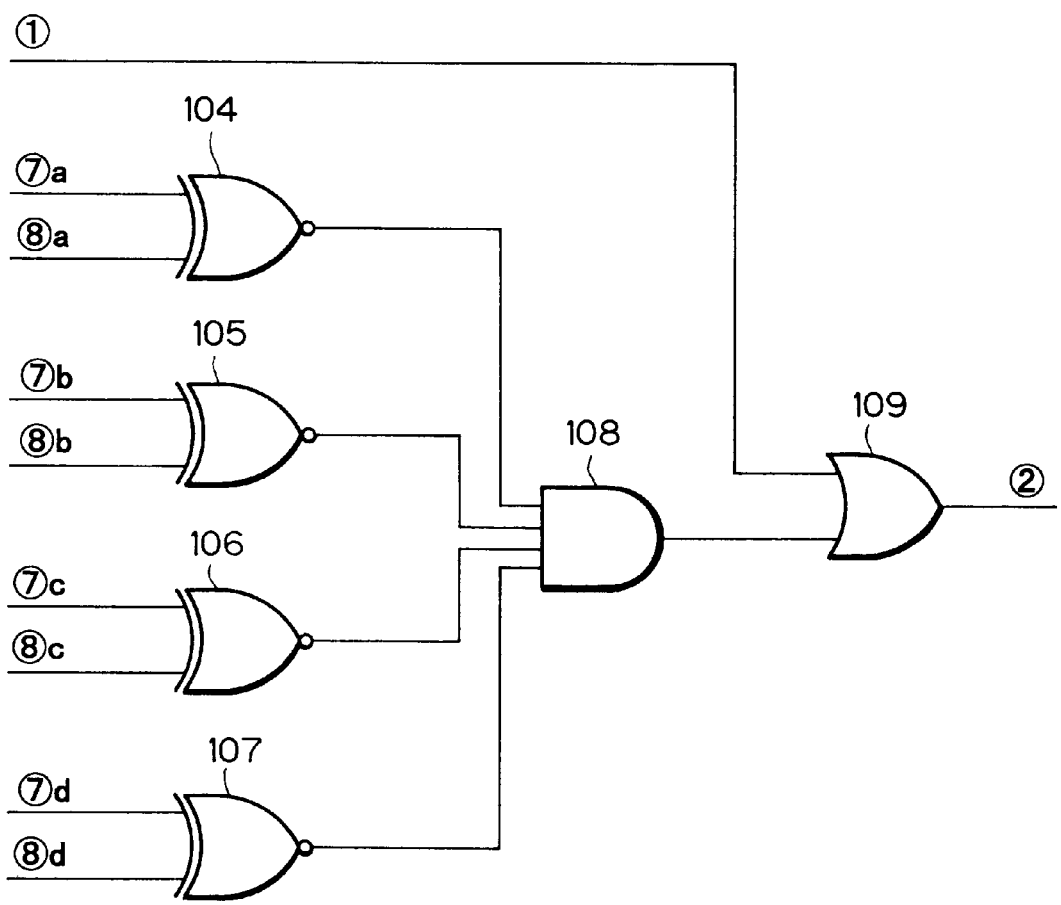
FIG. 13 is a circuit diagram showing the detail of a data comparing unit.

FIG. 12 shows the embodiment shown in FIG. 6 in more detail. The data comparing unit which is configured as shown in FIG. 13. The data comparing unit comprises an EXNOR circuit 104 which outputs an H (high) state signal when a data ⑦a input to the register 100 matches a data ⑧a output therefrom; an EXNOR circuit 105 which outputs an H (high) state signal when a data ⑦b input to the register 101 matches a data ⑧b output therefrom; an EXNOR circuit 106 which outputs an H (high) state signal when a data ⑦c input to the register 102 matches a data ⑧c output therefrom; an EXNOR circuit 107 which outputs an H (high) state signal when a data ⑦d input to the register 103 matches a data ⑧d output therefrom; an AND circuit 108 to which the outputs from respective EXNOR circuits 104 to 107 are input and which outputs an H (level) signal only when the outputs of the respective EXNOR circuits 104 to 107 are all in an H state; and a NOR circuit 109 to which a determination result signal ① from the basic circuit at the previous stage and an output from the AND circuit 108 are input and which outputs an H signal when both or either one of the determination result signal from the basic circuit at previous stage and the AND circuit 108 is in an H state.

The basic circuit 20A comprises a data comparing unit 21A; a NOR circuit 110 to which the determination result signal ① from the basic circuit at the previous stage and the output ② from the data comparing unit 21A are input; a D flip-flop circuit 111 which temporarily latches the output ③ from the NOR circuit 110 and outputs it in synchronization with rising-up of the system clock ⑤; and an AND circuit 112 to which a signal ④ which is an inverted output from the D flip-flop 111 and the system clock are input. The output from the D flip-flop 111 is output as the determination result signal A1. The determination result signal A1 and the determination result signal from the other module are input to the AND circuit 113. The output from the AND circuit 113 is input to the basic circuit 20B at next stage as a determination result signal A.

The basic circuit 20B comprises a D flip-flop circuit 114 which temporarily latches the determination result signal A from the basic circuit 20A and outputs it in synchronization with the falling-down of the system clock ⑤ and an AND circuit 115 to which an inverted output of the D flip-flop 114 and the system clock are input. The output from the D flip-flop 114 is output as the determination result signal B.

The basic circuit 20C comprises a D flip-flop circuit 116 which temporarily latches the determination result signal 20B from the basic circuit B and outputs it in synchronization with the falling-down of the system clock and an AND circuit 117 to which an inverted output of the D flip-flop 116 and the system clock are input. The output from the D flip-flop 116 is output as the determination result signal C.

Figure 14:
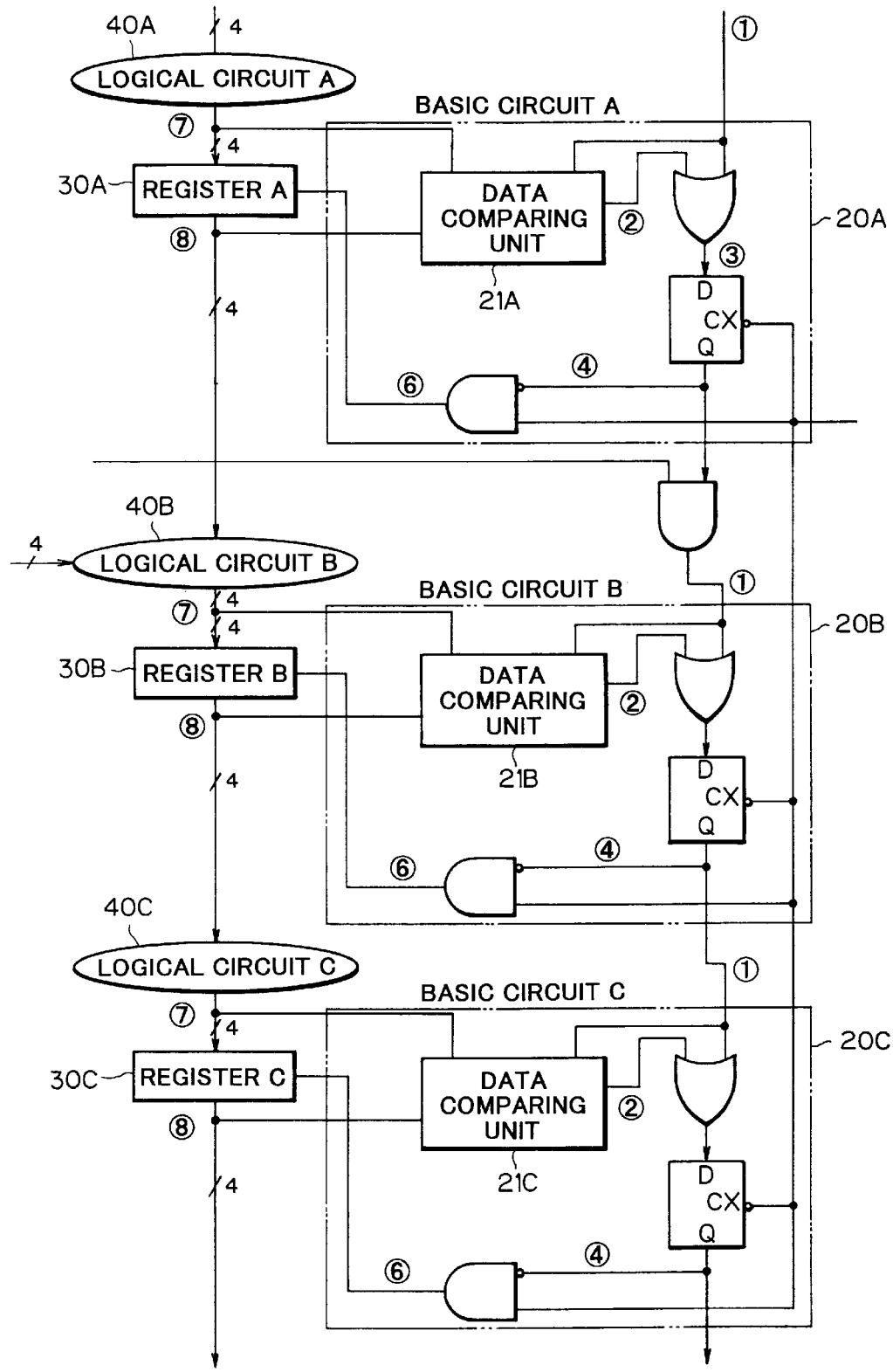
FIG. 14 is a circuit diagram showing an modification of the embodiment shown in FIG. 12.

In case of the circuit configuration as shown in FIG. 12, only the basic circuit 20A is provided with the data comparing unit 21A (the basic circuits 20B and 20C are not provided with data comparing units). However, the basic circuits 20B and 20C may be provided with data comparing units. FIG. 14 shows the exemplary circuit configuration in this case. The data comparing units 21B, 21C in the basic circuits 20B and 20C function entirely similarly to data comparing unit 21A in the basic circuit 20A shown in FIG. 12.

Figure 15:
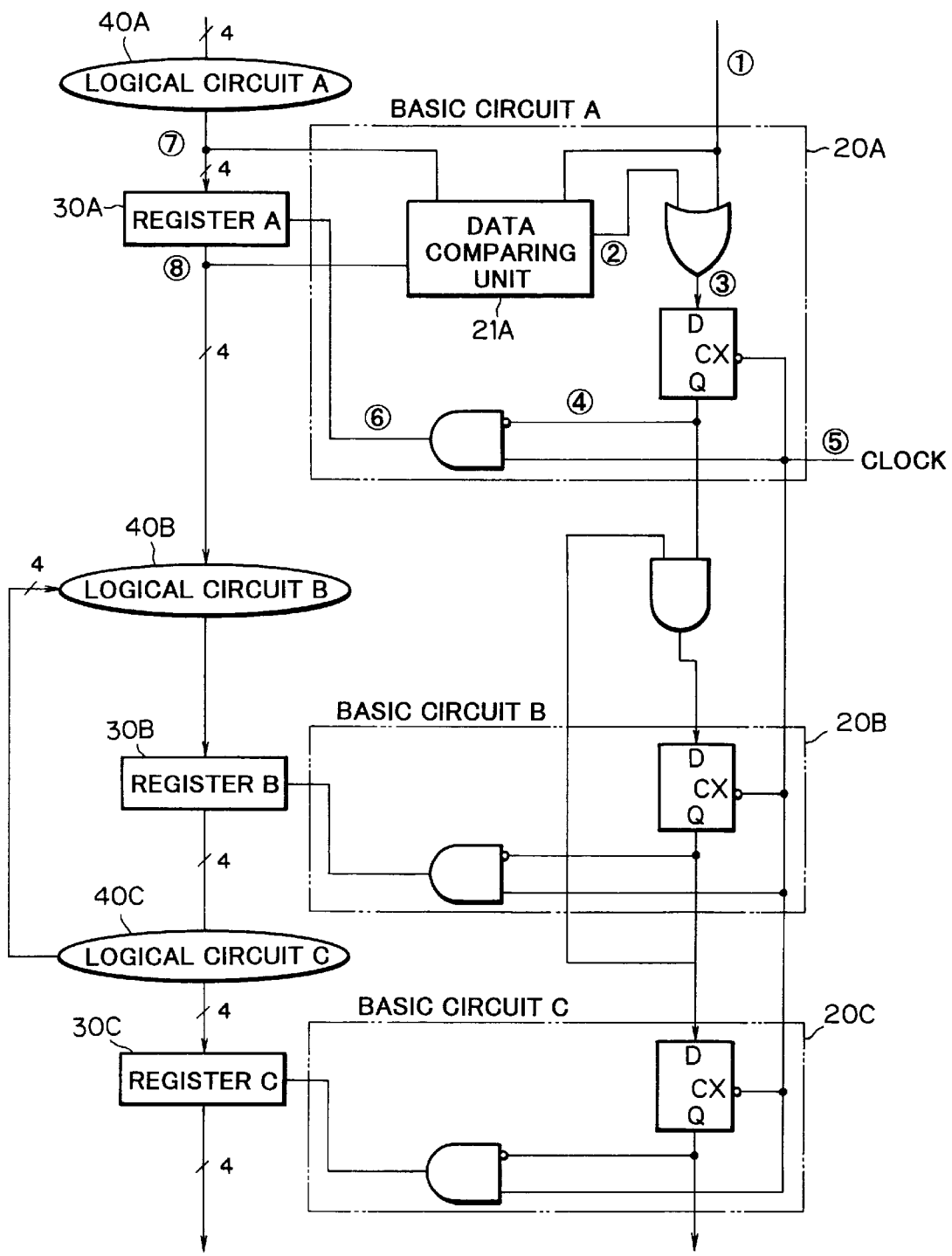
FIG. 15 is a circuit diagram showing the detailed circuit configuration of the embodiment shown in FIG. 7.
Figure 16:
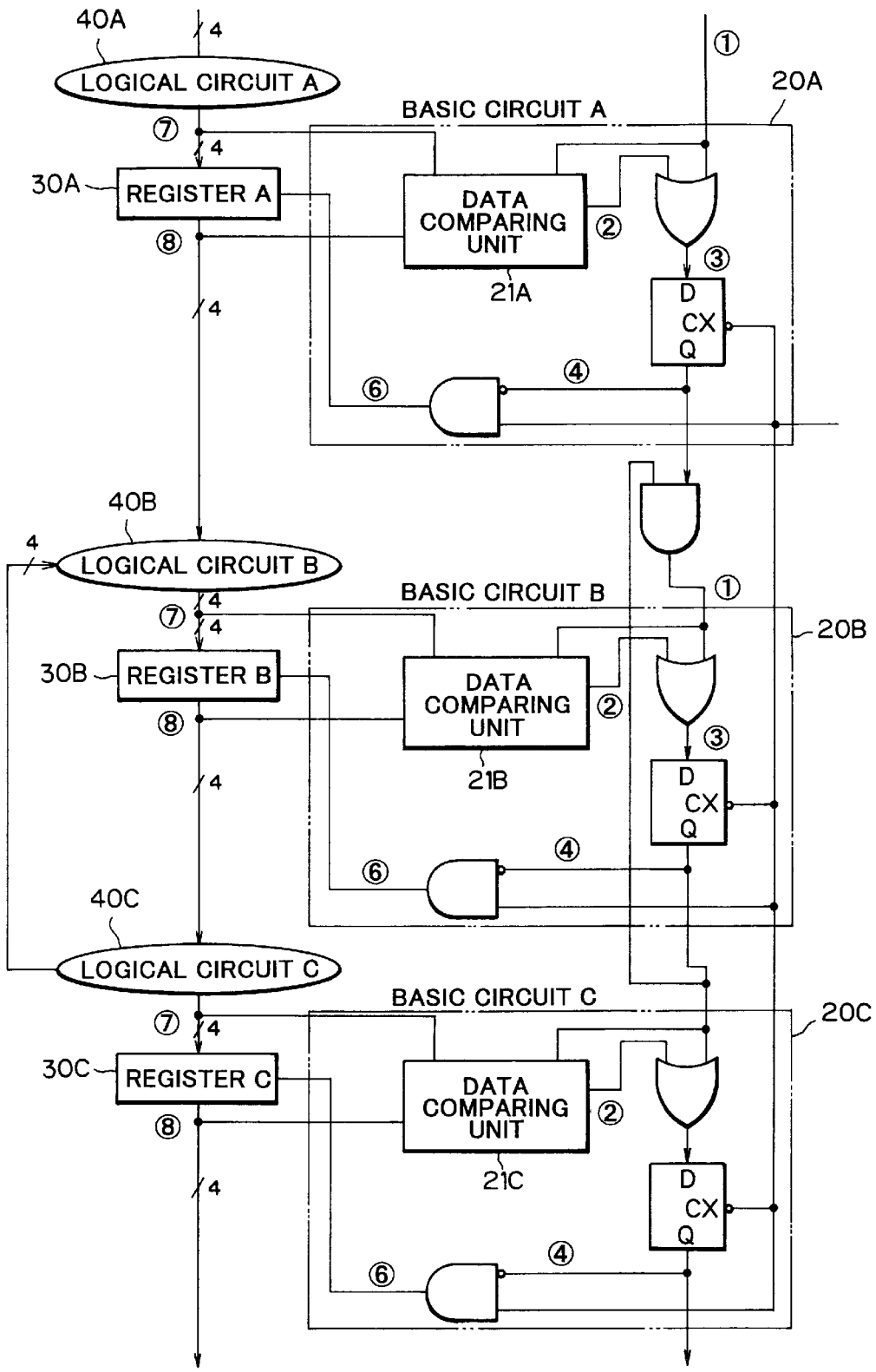
FIG. 16 is a circuit diagram showing a modification of the embodiment shown in FIG. 15.

FIG. 15 shows the embodiment shown in FIG. 7 in more detail. The structures of the register 30A, 30B, 30C and basic circuits 20A, 20B and 20C are identical with those shown in FIG. 12. Also in this case, the basic circuits 20B and 20C may be provided with the data comprising unit similarly to the circuit shown in FIG. 14. FIG. 16 shows the circuit configuration in this case.

Logical circuits are provided between the registers in the embodiments shown in FIGS. 6 and 7. Exemplary configurations in which logical circuits are not provided between the registers are shown in FIGS. 17 and 18.

Figure 17:
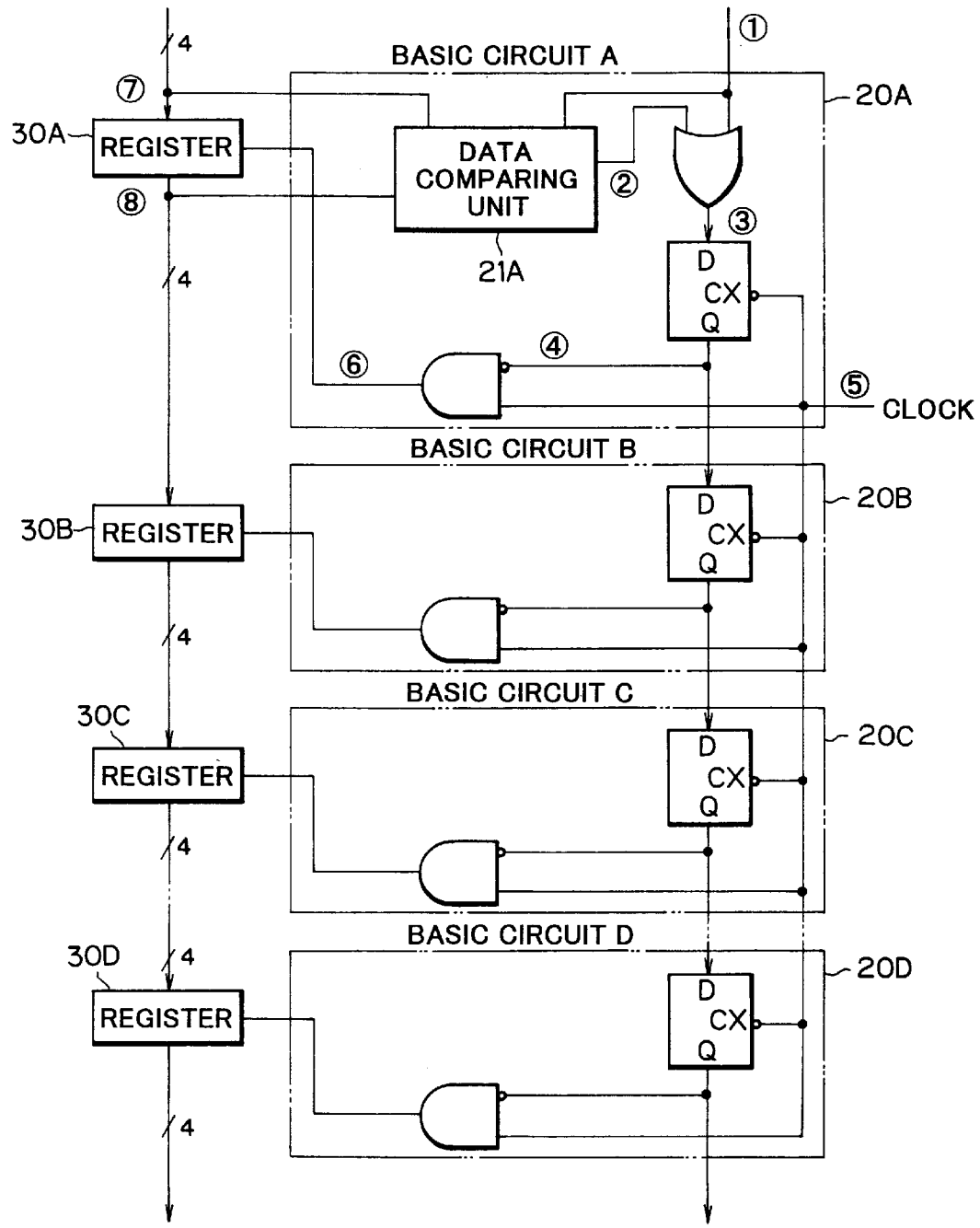
FIG. 17 is a circuit diagram showing a modification of the embodiments shown in FIGS. 6 and 7 in which a logical circuits are omitted from the embodiments shown in FIGS. 6 and 7.
Figure 18:
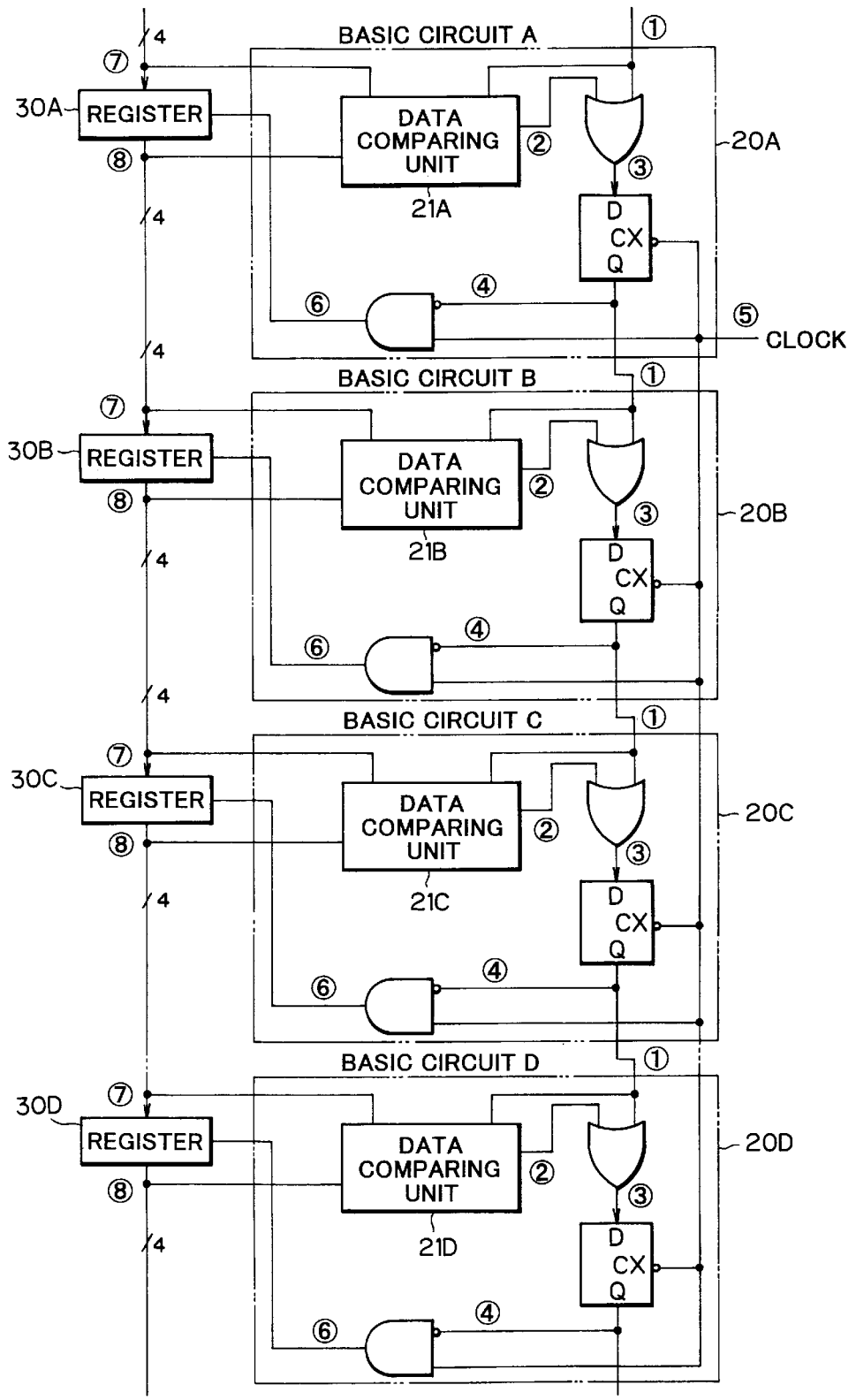
FIG. 18 is a circuit diagram showing a modification of the embodiment shown in FIG. 17.

In the embodiment shown in FIG. 17, only basic circuit 20A has a data comparing unit 21A and the other basic circuits 20B to 20D have no data comparing unit. In the embodiment shown in FIG. 18, all the basic circuits 20A to 20D have data comparing units 21A to 21D. Logical circuits comprise AND, NOR, OR circuits are inverter, etc.

The advantages of the present invention are as follows.

As is apparent from the foregoing description, a circuit which can be operated with a minimum power consumption can be manufactured by disposing the basic circuit of the present invention in each register of a data processing module in existing circuit so that the modules are coupled to each other in a direction of data processing flow. Since it is not necessary to consider the disturbance of the pipeline, adjustment of the processing period of time of the whole of the circuit is not necessary.

I claim:

1. In a synchronous circuit for accepting and outputting data in synchronization with clock signals, power consumption reduced register circuit wherein said circuit comprises a data determining unit for monitoring input and output data of register and for comparing the input data with the output data to output a comparison determination result signal; an OR gate for obtaining a logical sum of an input determination control signal and said determination result signal; a D type flip-flop for latching the output of said OR gate in synchronization with an inverted signal of a clock signal input to said register; and an AND gate for obtaining a logical product of the output of said D type flip-flop and said supplied clock signal, whereby the output signal from said AND gate is applied to said register.

2. In a synchronous circuit having a pipeline configuration for accepting and outputting data in synchronization with clock signals, a power consumption reduced register circuit wherein said circuit comprises a plurality of the basic circuits as defined in claim 1 which are coupled to each other, whereby clock signals are applied to only registers to be operated without causing any disturbance of the pipe line.

3. A power consumption reduced register circuit as defined in claim 1 or 2 wherein said data determining unit performs monitoring and comparison of input and output data of the other register as well as monitoring and comparison of the input and output data of a given register so that clock signals applied to each register are controlled.

4. A register circuit having a plurality of register stages, each stage accepting and outputting data in synchronization with a clock signal, comprising data match or unmatch detecting circuit for determining whether an input data to a first register stage matches an output data therefrom and for outputting a match and unmatch detection signals when both data match and do not match, respectively; clock signal supply control means for prohibiting a clock signal to be supplied to the first register stage in response to the match detection signals from said match and unmatch detecting means, and for permitting a clock signal to be supplied to the first register stage in response to the unmatch detection signals from said match and unmatch detecting means; latch circuits, each for one of second and subsequent stages, for storing said match or unmatch detecting signals which are transmitted in synchronization with the data transmission between the register stages; and clock signal supply control means, each for one of second and subsequent register stages, for prohibiting a clock signal to be supplied to each of second and subsequent register stages in response to the match detection signals from said latch circuits, and for permitting a clock signal to be supplied to each of second and subsequent register stages in response to the unmatch detection signals from said latch circuits.

* * * * *